US012559166B2

(12) United States Patent
Kim et al.

(10) Patent No.: US 12,559,166 B2
(45) Date of Patent: Feb. 24, 2026

(54) METHOD AND APPARATUS FOR CONTROLLING OF STEERING ASSISTANCE SYSTEM

(71) Applicant: HL MANDO CORPORATION, Gyeonggi-do (KR)

(72) Inventors: Taegyun Kim, Gyeonggi-do (KR); Sangwoo Jeong, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 75 days.

(21) Appl. No.: 18/385,377

(22) Filed: Oct. 30, 2023

(65) Prior Publication Data

US 2025/0058824 A1 Feb. 20, 2025

(30) Foreign Application Priority Data

Aug. 18, 2023 (KR) ......................... 10-2023-0108092

(51) Int. Cl.
B62D 5/04 (2006.01)
B62D 15/02 (2006.01)
(52) U.S. Cl.
CPC ......... B62D 5/0493 (2013.01); B62D 15/024 (2013.01)
(58) Field of Classification Search
CPC .... B62D 5/0493; B62D 5/049; B62D 5/0484; B62D 15/024; B62D 15/021; B60Y 2306/13; B60Y 2306/15
USPC ........................................ 701/41, 42, 43, 44
See application file for complete search history.

(56) References Cited

FOREIGN PATENT DOCUMENTS

| | | | | |
|---|---|---|---|---|
| JP | 2003-160054 | | 6/2003 | |
| JP | 3541867 | B2 * | 7/2004 | ............... B62D 6/00 |
| JP | 4032713 | B2 * | 1/2008 | ............... B62D 5/04 |
| JP | 4169174 | B2 * | 10/2008 | ............... B60T 8/36 |
| JP | 5967338 | | 8/2016 | |
| JP | 2022-14696 | | 1/2022 | |
| KR | 20130055840 | A * | 5/2013 | ............... B62D 6/10 |

(Continued)

OTHER PUBLICATIONS

Sangwoo Jeong et al.: "A study on TAS sensor failure detection algorithm for redundant system based EPS system", KSAE 2022 Annual Autumn Conference, Gyeonggi-do, Korea, Nov. 16, 2022, pp. 1-6.

(Continued)

*Primary Examiner* — Hai H Huynh
(74) *Attorney, Agent, or Firm* — WOMBLE BOND DICKINSON (US) LLP

(57) ABSTRACT

The disclosure invention relates to a method and apparatus for controlling a steering assistance system, and includes identifying, with an electronic device, movement information according to driving of a vehicle, estimating, with the electronic device, a steering angle of front-wheel for the vehicle based on the movement information and converting the steering angle of front-wheel into a steering angle of steering wheel, identifying, with the electronic device, sensing data obtained from each of a plurality of sensors provided in the vehicle, identifying, with the electronic device, whether the sensors have an error using the sensing data and the steering angle of steering wheel, and controlling, with the electronic device, the steering assistance system of the vehicle based on whether the sensors have the error.

17 Claims, 3 Drawing Sheets

(56)           References Cited

FOREIGN PATENT DOCUMENTS

| KR | 10-2013-0137892 | 12/2013 |
| KR | 10-2023-0116210 | 8/2023 |

OTHER PUBLICATIONS

Office Action dated Apr. 17, 2025 for Korean Patent Application No. 10-2023-0108092 and its English translation by Google Translate. Notice of Allowance dated Oct. 10, 2025 for Korean Patent Application No. 10-2023-0108092 and its English translation provided by Applicant's foreign counsel.

* cited by examiner

100

110

140 130

120

METHOD AND APPARATUS FOR CONTROLLING OF STEERING ASSISTANCE SYSTEM

CROSS-REFERENCE TO RELATED APPLICATION

This application claims priority to and the benefit of Korean Patent Application No. 10-2023-0108092, filed on Aug. 18, 2023, the disclosures of which is incorporated herein by reference in its entirety.

FIELD

The disclosure invention relates to a method and apparatus for controlling a steering assistance system.

BACKGROUND

A multiplexed system refers to a system that simultaneously operates a unit system or a sensor (hereinafter referred to as a sensor) with the same function to ensure robustness against failure of products such, as a vehicle, in which the multiplexed system is implemented. In particular, in the automotive field, the multiplexed system is applied to various components such as electronic power steering (EPS), and a redundant system consisting of two unit systems is most widely applied in consideration of system complexity, cost, and spatial limitations.

The redundant system may determine whether a sensor has an error when the sensing data obtained from the two sensors are different, but it is difficult to identify which sensor operates normally. Therefore, when the error has occurred in one sensor, the overall function of the device to which the redundant system is applied, for example, an electronic power steering device, may be degraded or stopped even though the other sensor operates normally.

Therefore, there is a need for a method for identifying the sensor where the error occurs and maintaining the operation of the device to which the redundant system is applied normally when the error has occurred in one sensor included in the redundant system.

SUMMARY

The embodiments of the disclosure invention to solve the conventional problems provide a method and apparatus for controlling a steering assistance system that may identify an error occurred in any one of a plurality of sensors used to implement an electric power steering (EPS) included in a vehicle.

The method for controlling a steering assistance system according to an embodiment of the disclosure invention may include identifying, with an electronic device, movement information according to driving of a vehicle, estimating, with the electronic device, a steering angle of front-wheel for the vehicle based on the movement information and converting the steering angle of front-wheel into a steering angle of steering wheel, identifying, with the electronic device, sensing data obtained from each of a plurality of sensors provided in the vehicle, identifying, with the electronic device, whether the sensors have an error using the sensing data and the steering angle of steering wheel, and controlling, with the electronic device, the steering assistance system of the vehicle based on whether the sensors have the error.

In addition, the identifying the movement information may include identifying the movement information including a speed, a yaw rate, and a lateral acceleration according to the driving of the vehicle.

In addition, the converting the steering angle of front-wheel into the steering angle of steering wheel may include estimating the steering angle of front-wheel by applying a value related to the movement information and a value derived using a bicycle model to a Kalman filter.

In addition, the converting the steering angle of front-wheel into the steering angle of steering wheel may include converting the steering angle of front-wheel into the steering angle of steering wheel using the steering angle of front-wheel and a gear ratio.

In addition, the identifying whether the sensors have the error may include comparing the sensing data respectively and comparing the converted steering angle of steering wheel and the sensing data respectively.

In addition, after comparing the converted steering angle of steering wheel and the sensing data respectively, the method may further include identifying that the error has occurred in at least one sensor among the plurality of sensors corresponding to each of the sensing data if a difference value of the sensing data is equal to or greater than a first threshold value.

In addition, after comparing the converted steering angle of steering wheel and the sensing data respectively, the method may further include identifying that the error has not occurred in the plurality of sensors if a difference value of the sensing data is less than a first threshold value.

In addition, after comparing the converted steering angle of steering wheel and the sensing data respectively, the method may further include identifying sensing data whose difference value with the converted steering angle of steering wheel is greater than or equal to a second threshold value among the sensing data.

In addition, after identifying the sensing data greater than or equal to the second threshold value, the method may further include if there is sensing data whose difference value with the converted steering angle of steering wheel is greater than or equal to the second threshold value among the sensing data, identifying that the error has occurred in the sensor related to the corresponding sensing data.

In addition, after identifying that the error has occurred in the sensor related to the corresponding sensing data, the method may further include accumulating an error count every time the error occurs in the sensor by performing a time damper, and re-identifying that the error has occurred in the sensor if the accumulated error count is greater than or equal to a third threshold value.

In addition, the apparatus for controlling a steering assistance system, the apparatus may include a first sensor and a second sensor for obtaining sensing data according to driving of a vehicle, and controller configured to control the steering assistance system of the vehicle by converting a steering angle of front-wheel for the vehicle estimated based on movement information according to the driving of the vehicle into a steering angle of steering wheel, and by identifying whether an error has occurred in at least one of the first sensor and the second sensor using the sensing data and the steering angle of steering wheel obtained from the first sensor and the second sensor, respectively.

In addition, the movement information may include a speed, a yaw rate, and a lateral acceleration according to the driving of the vehicle.

In addition, the controller may estimate the steering angle of front-wheel by applying a value related to the movement information and a value derived using a bicycle model to a Kalman filter.

In addition, the controller may convert the steering angle of front-wheel into the steering angle of steering wheel using the steering angle of front-wheel and a gear ratio.

In addition, the controller may compare the sensing data respectively, and compare the converted steering angle of steering wheel and the sensing data respectively, to identify whether the sensors have the error.

In addition, the controller may identify that the error has occurred in at least one of the first sensor and the second sensor if a difference value of the sensing data is equal to or greater than a first threshold value.

In addition, the controller may identify that the error has not occurred in the first sensor and the second sensor if a difference value of the sensing data is less than a first threshold value.

In addition, the controller may identify sensing data whose difference value with the converted steering angle of steering wheel is greater than or equal to a second threshold value among the sensing data.

In addition, the controller may identify that the error has occurred in the first sensor or the second sensor related to sensing data whose difference value with the converted steering angle of steering wheel is greater than or equal to a second threshold value among the sensing data.

In addition, the controller may perform a time damper to re-identify that the error has occurred in the sensor if the accumulated error count is greater than or equal to a third threshold value every time the error occurs in the sensor.

As described above, the method and apparatus for controlling the steering assistance system according to the disclosure invention distinguish between a sensor in which an error occurred and a sensor operating normally among the plurality of sensors used when implementing an electric power steering (EPS) included in a vehicle, thereby enabling the steering operation to be normally performed.

DETAILED DESCRIPTION

Figure 1:
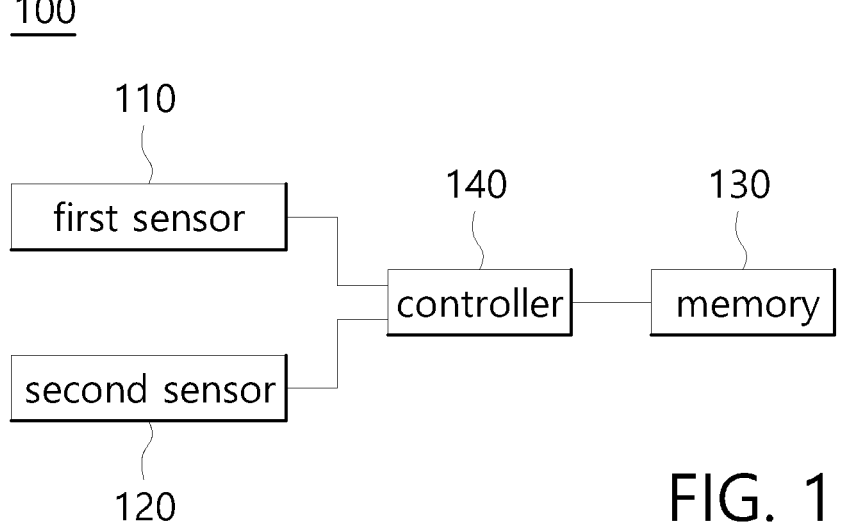
FIG. 1 is a diagram showing a main configuration of an electronic device for controlling a steering assistance system according to an embodiment of the disclosure invention.

Hereinafter, preferred embodiments according to the disclosure invention will be described in detail with reference to the accompanying drawings. The detailed description that will be disclosed below along with the accompanying drawings is intended to explain exemplary embodiments of the disclosure invention, and is not intended to represent the only embodiments in which the disclosure invention can be practiced. In the drawings, parts irrelevant to the description may be omitted to clearly explain the disclosure invention, and the same reference numerals may be used for the same or similar components throughout the entire specification.

FIG. 1 is a diagram showing a main configuration of an electronic device for controlling a steering assistance system according to an embodiment of the disclosure invention.

Referring to FIG. 1, the electronic device 100 according to the disclosure invention may include a first sensor 110, a second sensor 120, a memory 130, and a controller 140. In this case, the electronic device 100 may have some components included in the steering assistance system, or may be a device implemented separately from the steering assistance system to control an operation of the steering assistance system.

The first sensor 110 and the second sensor 120 are sensors for sensing actual steering angle that changes according to the movement of the vehicle, and may be a torque and angle sensor (TAS). Based on this, the first sensor 110 and the second sensor 120 may obtain sensing data on the steering angle of the steering wheel that changes according to a movement of a vehicle when the vehicle is driven, and provide the sensing data to the controller 140.

To this end, the first sensor 110 and the second sensor 120 may perform wireless communication such as Bluetooth, Bluetooth low energy (BLE), controller area network (CAN), near field communication (NFC), and zigbee with the controller 140, and may perform serial communication such as RS-232, respectively.

In addition, although not shown, the electronic device 100 may include various sensors that can identify various movement information based on driving of the vehicle. At this time, the movement information may include a speed, yaw rate, and lateral acceleration according to the driving of the vehicle.

The memory 130 stores an operation program for the operation of the electronic device 100. In particular, the memory 130 may store a bicycle model for extracting a slip angle and the yaw rate of the vehicle, and may store a Kalman filter capable of estimating the front wheel steering angle based on a result value extracted by using the bicycle model and vehicle movement information.

When it is identified that the vehicle has started driving, the controller 140 identifies vehicle movement information based on the sensing data detected by various sensors (not shown) provided inside the vehicle. At this time, the vehicle movement information may include the speed, yaw rate, and lateral acceleration according to the driving of the vehicle.

The controller 140 estimates the front wheel steering angle for the front wheel of the vehicle. At this time, the controller 140 calls the bicycle model stored in the memory 130 to extract the slip angle and yaw rate of the vehicle. The controller 140 may estimate the front wheel steering angle of the vehicle by applying the result value extracted using the bicycle model and vehicle movement information to the Kalman filter. The controller 140 multiplies the estimated front wheel steering angle by a gear ratio and converts the same into a steering wheel steering angle. In addition, the converted steering angle is a value estimated by the front wheel steering angle.

The controller 140 identifies the first sensing data and the second sensing data obtained by the first sensor 110 and the second sensor 120, respectively. The first sensing data and the second sensing data may mean the steering angle of the steering wheel that is actually identified when driving the vehicle.

The controller 140 may identify whether at least one of the first sensor 110 and the second sensor 120 has an error. More specifically, the controller 140 compares a difference value between the first sensing data and the second sensing data with a first threshold value. When the difference value between the first sensing data and the second sensing data is equal to or higher than the first threshold value, the controller 140 may identify that an error has occurred in at least one of the first sensor 110 and the second sensor 120. On the contrary, when the difference value between the first sensing data and the second sensing data is less than the first threshold value, the controller 140 may identify that the first sensor 110 and the second sensor 120 are normal.

If the error has occurred in at least one of the first sensor 110 and the second sensor 120, the controller 140 compares the converted steering angle of the steering wheel, the first sensing data, and the converted steering angle of the steering wheel and the second sensing data, respectively. As a result of the comparison, the controller 140 may identifies that both the first sensor 110 and the second sensor 120 are normal if the converted steering angle of the steering wheel and the first sensing data do not differ by more than the second threshold value, and if the converted steering angle of the steering wheel and the second sensing data do not differ by more than the second threshold value. That is, the controller 140 may identify whether an error has occurred in at least one sensor identified based on the first threshold value.

On the contrary, if at least one of the first sensing data and the second sensing data is different from the converted steering angle of the steering wheel by a second threshold value, the controller 140 may identify that an error occurs in the sensor associated with the sensing data that is different from the second threshold value or more. For example, the controller 140 may identify that an error occurs in the first sensor 110 related to the first sensing data if the first sensing data differs from the converted steering angle of the steering wheel by a second threshold value or more.

As such, if it is identified that an error has occurred in the first sensor 110, the controller 140 accumulates the error count value for the first sensor 110 by performing a time damper. For example, when the driver of the vehicle changes steering at a high speed, the converted steering angle of steering wheel may not be accurately identified and thus an error may occur, so the controller 140 may perform the time damper to more precisely identify whether the first sensor 110 and the second sensor 120 have the error.

More specifically, when it is identified that the error has occurred in the first sensor 110, the controller 140 may add 1 to the error count value of the first sensor 110 and periodically (for example, 2 ms period) compare the first sensing data with the converted steering angle of steering wheel. If the controller 140 identify the sensing data whose difference value with the converted steering angle of steering wheel is less than a second threshold value while periodically comparing the first sensing data with the converted steering angle of steering wheel, the controller 140 may subtract 1 from the accumulated error count value of the first sensor 110.

If the error count value of the first sensor 110 accumulated during the threshold time is equal to or greater than a third threshold value, the controller 140 re-identifies that the error has occurred in the first sensor 110, and reduces the performance of the steering assistance system of the vehicle, thereby allowing the driver to intervene in driving the vehicle.

Further, when the accumulated error count value of the first sensor 110 is less than the third threshold value, the controller 140 may determine that the first sensor 110 is normal to maintain the performance of the steering assistance system.

More specifically, when both the first sensor 110 and the second sensor 120 are normal, the controller 140 maintains the performance of the steering assistance system based on the first sensor 110 and the second sensor 120. If the error has occurred in any one of the first sensor 110 and the second sensor 120, the controller 140 reduces the performance of the steering assistance system to allow the driver to intervene in driving the vehicle. Further, if the error has occurred in both the first sensor 110 and the second sensor 120, the controller 140 stops the performance of the steering assistance system to entirely control the driving of the vehicle according to the driver's operation without the intervention of the steering assistance system.

Figure 2:
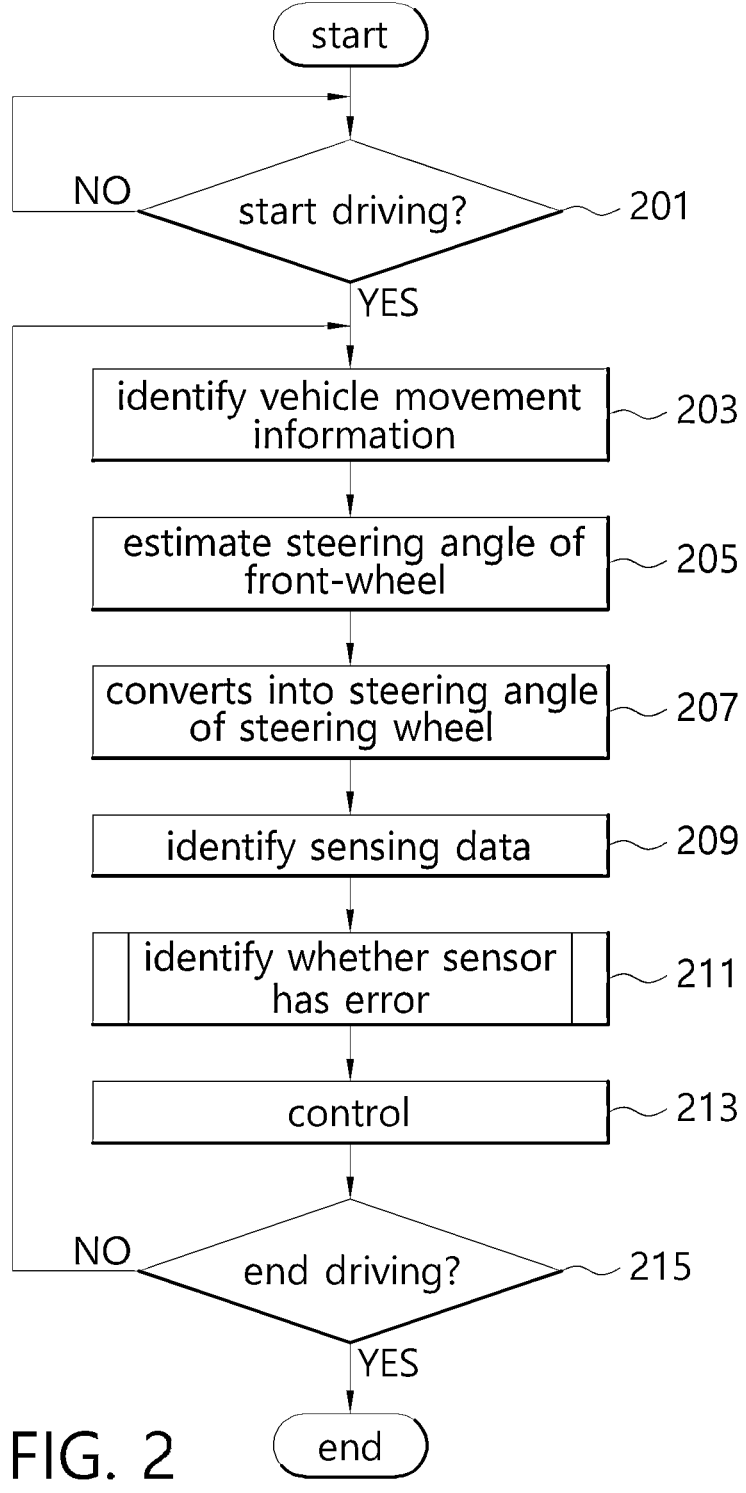
FIG. 2 is a flowchart illustrating a method for controlling a steering assistance system according to an embodiment of the disclosure invention.

FIG. 2 is a flowchart illustrating a method for controlling a steering assistance system according to an embodiment of the disclosure invention.

Referring to FIG. 2, if it is identified that driving of the vehicle starts driving in Step 201, the controller 140 performs Step 203. In Step 203, the controller 140 identifies vehicle movement information based on sensing data detected by various sensors (not shown) provided inside the vehicle. At this time, the vehicle movement information may include the speed, yaw rate, and lateral acceleration of the vehicle according to the driving of the vehicle.

In Step 205, the controller 140 estimates the steering angle of front-wheel for the vehicle. At this time, the controller 140 may extract the slip angle and yaw rate of the vehicle using the bicycle model, and apply the extracted result value and vehicle movement information to the Kalman filter to estimate the steering angle of front wheel using the bicycle model. In Step 207, the controller 140 multiplies the estimated steering angle of front-wheel by a gear ratio and converts the same into a steering angle of steering wheel.

In Step 209, the controller 140 identifies the first sensing data and the second sensing data obtained by the first sensor 110 and the second sensor 120, respectively. In this case, the first sensor 110 and the second sensor 120 are sensors for detecting steering angle, and may be a torque and angle sensor (TAS). In this case, the first sensing data and the second sensing data may mean the steering angle of steering wheel that is actually identified when driving the vehicle.

Figure 3:
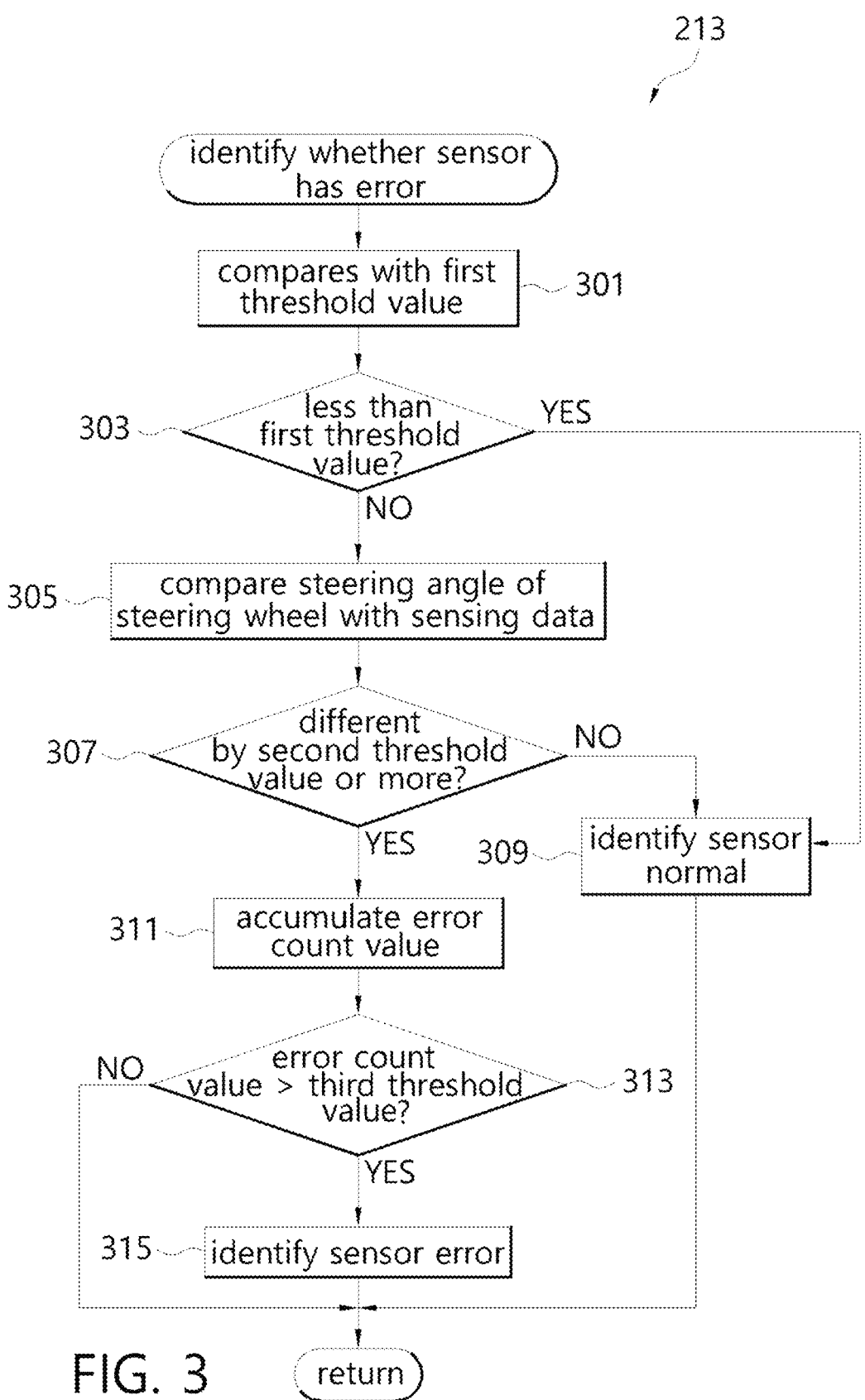
FIG. 3 is a detailed flowchart illustrating a method for identifying whether a sensor has an error according to an embodiment of the disclosure invention.

In Step 211, the controller 140 may identify whether at least one of the first sensor 110 and the second sensor 120 has an error. This will be described in more detail using FIG. 3 below. FIG. 3 is a detailed flowchart illustrating a method for identifying whether a sensor has an error according to an embodiment of the disclosure invention.

Referring to FIG. 3, in Step 301, the controller 140 compares the difference value between the first sensing data and the second sensing data with a first threshold value. In Step 303, the controller 140 may perform Step 305 by identifying that the error has occurred in at least one of the first sensor 110 and the second sensor 120 if the difference value between the first sensing data and the second sensing data is equal to or greater than the first threshold value based on the comparison result of Step 301. On the contrary, in Step 303, the controller 140 identifies that the difference value of the comparison result of Step 301 is less than the first threshold, the first sensor 110 and the second sensor 120 do not have an error, and performs Step 309.

In Step 305, the controller 140 compares the steering angle of steering wheel converted in Step 207 with the first sensing data, and the converted steering angle of steering wheel with the second sensing data, respectively. In Step 307, the controller 140 performs Step 309 if the converted steering angle of steering wheel and the first sensing data are not different by a second threshold value or more, and the converted steering angle of the steering wheel and the second sensing data are not different by a second threshold value or more. In Step 309, the controller 140 identifies that both the first sensor 110 and the second sensor 120 are normal and returns to Step 213 of FIG. 2.

On the contrary, in Step 307, if at least one of the first sensing data and the second sensing data is different from the converted steering angle of steering wheel by the second threshold value or more, the controller 140 identifies that the error has occurred in the sensor associated with the sensing data that is different by the second threshold value or more and performs Step 311. For example, if the first sensing data is different from the converted steering angle of the steering wheel by the second threshold value or more, the controller 140 may identify that the error has occurred in the first sensor 110 related to the first sensing data and perform Step 311.

In Step 311, the controller 140 accumulates an error count value for the sensor where the error has occurred by performing a time damper. For example, when the driver of the vehicle changes steering at a high speed, the steering angle of steering wheel converted in Step 207 may not be accurately identified and thus an error may occur, so the controller 140 may perform the time damper to more precisely identify whether the first sensor 110 and the second sensor 120 have the error. More specifically, since the controller 140 identified that the error has occurred in the first sensor 110 in Step 307, it may add 1 to the error count value of the first sensor 110 and periodically (e.g., 2 ms period) compare the first sensing data and the converted steering angle of steering wheel. If it is identified that the first sensing data is less than the second threshold value compared to the converted steering angle of steering wheel, while periodically comparing the converted steering angle of steering wheel, the controller 140 may subtract 1 from the accumulated error count value of the first sensor 110.

In Step 313, if the error count value of the first sensor 110 accumulated during the threshold time is equal to or greater than the third threshold, the controller 140 performs Step 315, and if the accumulated error count value of the first sensor 110 is less than the third threshold, the controller 140 returns to Step 213 of FIG. 2. For example, if the accumulated error count value of the first sensor 110 is less than the third threshold, the controller 140 identifies that the error of the first sensor 110 identified in Step 307 is wrong and returns to Step 213 of FIG. 2.

In Step 315, since the accumulated error count value for the first sensor 110 is equal to or greater than the third threshold, the controller 140 re-identifies that the error has occurred in the first sensor 110 and returns to Step 213 of FIG. 2.

In Step 213, the controller 140 controls the steering assistance system of the vehicle according to whether the sensor has an error. More specifically, if both the first sensor 110 and the second sensor 120 are normal, the controller 140 maintains the performance of the steering assistance system based on the first sensor 110 and the second sensor 120. If the error has occurred in any one of the first sensor 110 and the second sensor 120, the controller 140 reduces the performance of the steering assistance system and allows the driver to intervention in driving the vehicle.

In addition, if both the first sensor 110 and the second sensor 120 have the error, the controller 140 stops the performance of the steering assistance system and controls the driving of the vehicle according to the operation of the driver without intervention.

In Step 215, the controller 140 ends the corresponding process if the end of the vehicle driving is detected, and returns to Step 203 and then Steps 203 to 213 may be re-performed if the end of the vehicle driving is not detected. In addition, although not shown, if the error has occurred in both the first sensor 110 and the second sensor 120, the controller 140 may continuously wait for the end of the vehicle driving without returning to Step 203.

The embodiments of the disclosure invention disclosed in this specification and drawings are only presented to easily explain the technical content of the disclosure invention and to aid in understanding the disclosure invention, and are not intended to limit the scope of the disclosure invention. Therefore, the scope of the disclosure invention should be interpreted as including all changes or modified forms derived based on the technical spirit of the disclosure invention in addition to the embodiments disclosed herein.

What is claimed is:

1. A method for controlling a steering assistance system of a vehicle, the method comprising:

obtaining first sensing data and second sensing data from a first sensor and a second sensor, respectively;

identifying whether an error has occurred in one of the first sensor and the second sensor based on a difference between the first sensing data and the second sensing data;

identifying which of the first sensor and the second sensor has the error, using the first sensing data, the second sensing data and a steering angle of a steering wheel of the vehicle;

reidentifying an occurrence of the error by performing a time damper operation on sensing data corresponding to the identified sensor; and controlling the steering assistance system of the vehicle based on a result of the reidentifying, wherein the reidentifying comprises:

counting a number of occurrences of the error in the identified sensor at a preset interval during a threshold time; and reidentifying that the error has occurred in the identified sensor when the counted number of occurrences of the error in the identified sensor is equal to or greater than a third threshold value.

2. The method of claim 1, further comprising:

obtaining the steering angle of the steering wheel of the vehicle.

3. The method of claim 2, wherein the obtaining the steering angle of the steering wheel of the vehicle comprises:

estimating a steering angle of front-wheel by applying a value related to movement information and a value derived using a bicycle model to a Kalman filter, and wherein the movement information includes a speed, a yaw rate, and a lateral acceleration according to a driving of the vehicle.

4. The method of claim 3, wherein the obtaining the steering angle of the steering wheel of the vehicle further comprises:

converting the steering angle of front-wheel into the steering angle of steering wheel of the vehicle using the steering angle of front-wheel and a gear ratio.

5. The method of claim 1, wherein the identifying whether an error has occurred in one of the first sensor and the second sensor comprises:

determining the error has occurred when the difference between the first sensing data and the second sensing data is equal to or higher than a first threshold value.

6. The method of claim 1, wherein the identifying which of the first sensor and the second sensor has the error comprises:

comparing the first sensing data and the second sensing data with the steering angle of the steering wheel of the vehicle, respectively;

determining sensing data, among the first sensing data and the second sensing data, whose difference from the steering angle of the steering wheel of the vehicle is greater than or equal to a second threshold.

7. The method of claim 1, wherein the controlling comprises:

reducing a performance of the steering assistance system to allow a driver to intervene in driving the vehicle when the error has occurred in any one of the first sensor and the second sensor.

8. The method of claim 1, wherein the controlling comprises:

stopping a performance of the steering assistance system to control the driving of the vehicle according to a driver's operation when the error has occurred in both the first sensor and the second sensor.

9. An apparatus for controlling a steering assistance system of a vehicle, the apparatus comprising:

a first sensor and a second sensor for obtaining first sensing data and second sensing data, respectively, according to driving of a vehicle; and controller configured to control a performance of the steering assistance system of the vehicle:

by identifying whether an error has occurred in one of the first sensor and the second sensor based on a difference between the first sensing data and the second sensing data, by identifying which of the first sensor and the second sensor has the error, using the first sensing data, the second sensing data and a steering angle of a steering wheel of the vehicle, and by reidentifying an occurrence of the error by performing a time damper operation on sensing data corresponding to the identified sensor, wherein the controller stops the performance of the steering assistance system to control a driving of the vehicle according to a driver's operation when the error has occurred in both the first sensor and the second sensor.

10. The apparatus of claim 9, wherein the controller obtains the steering angle of the steering wheel of the vehicle.

11. The apparatus of claim 10, wherein the controller is configured to:

estimate a steering angle of front-wheel by applying a value related to movement information and a value derived using a bicycle model to a Kalman filter, wherein the movement information includes a speed, a yaw rate, and a lateral acceleration according to the driving of the vehicle.

12. The apparatus of claim 11, wherein the controller is configured to:

convert the steering angle of front-wheel into the steering angle of steering wheel of the vehicle using the steering angle of front-wheel and a gear ratio.

13. The apparatus of claim 9, wherein the controller is configured to:

determine the error has occurred when the difference between the first sensing data and the second sensing data is equal to or higher than a first threshold value.

14. The apparatus of claim 9, wherein the controller is configured to:

compare the first sensing data and the second sensing data with the steering angle of the steering wheel of the vehicle, respectively, and determine sensing data, among the first sensing data and the second sensing data, whose difference from the steering angle of the steering wheel of the vehicle is greater than or equal to a second threshold.

15. The apparatus of claim 14, wherein the controller is configured to:

reidentify that the error has occurred in the identified sensor when the counted number of occurrences of the error in the identified sensor is equal to or greater than a third threshold value.

16. The apparatus of claim 9, wherein the controller is configured to:

count a number of occurrences of the error in the identified sensor at a preset interval during a threshold time.

17. The apparatus of claim 9, wherein the controller is configured to:

reduce the performance of the steering assistance system to allow a driver to intervene in driving the vehicle when the error has occurred in any one of the first sensor and the second sensor.

\* \* \* \* \*